(12) United States Patent
He et al.

(10) Patent No.: US 11,982,439 B2
(45) Date of Patent: May 14, 2024

(54) LENS AND LIGHT SOURCE MODULE

(71) Applicants: Self Electronics Co., Ltd., Zhejiang (CN); Wanjiong Lin, Zhejiang (CN); Self Electronics USA Corporation, Norcross, GA (US)

(72) Inventors: Zuping He, Zhejiang (CN); Jun Yang, Zhejiang (CN); Liang Wu, Zhejiang (CN); Jianguo Dong, Zhejiang (CN); Kai Xu, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 18/336,566

(22) Filed: Jun. 16, 2023

(65) Prior Publication Data
US 2024/0003515 A1    Jan. 4, 2024

(30) Foreign Application Priority Data

Jun. 29, 2022    (CN) .......................... 202210761405.1

(51) Int. Cl.
*F21V 5/04*    (2006.01)

(52) U.S. Cl.
CPC .................................. *F21V 5/045* (2013.01)

(58) Field of Classification Search
CPC ........................................................ F21V 5/045
See application file for complete search history.

(56) References Cited

U.S. PATENT DOCUMENTS

| | | | |
|---|---|---|---|
| 9,714,754 B2 * | 7/2017 | Spinger ................. | F21S 43/239 |
| 2019/0277478 A1 * | 9/2019 | Streppel ............. | G02B 19/0061 |
| 2019/0383465 A1 * | 12/2019 | Van Der Sijde .... | G02B 19/0028 |
| 2020/0271297 A1 * | 8/2020 | Streppel ................... | G02B 3/08 |
| 2021/0140606 A1 * | 5/2021 | Dross ................. | G02B 19/0061 |
| 2022/0268421 A1 * | 8/2022 | Chen ................. | G02F 1/133603 |

* cited by examiner

*Primary Examiner* — Christopher E Dunay
(74) *Attorney, Agent, or Firm* — Wang Law Firm, Inc.

(57) ABSTRACT

A lens and light source module include: a light receiving surface; a light distribution surface, along the optical axis direction set opposite to the light receiving surface; light receiving surface away from the optical axis center region to form N groups of projection, where N≥1; each with a first incident surface and a first reflective surface. The first incident surface is adapted to refracting light to the first reflective surface; the first reflective surface is adapted to reflecting light to a light distribution surface and refracting light to a display by the light distribution surface. The lens provided by the present invention enables the majority of light to be directed to the shelf in a targeted manner, which is conducive to achieving balanced light distribution and enhancing light efficiency.

12 Claims, 8 Drawing Sheets

LENS AND LIGHT SOURCE MODULE

RELATED APPLICATION

This application claims priority to a Chinese Patent Application No. CN202210761405.1, filed on Jun. 29, 2022.

FIELD OF THE TECHNOLOGY

The present invention relates to the technical field of lighting equipment, and specifically to a lens and light source module.

BACKGROUND

In shopping malls, supermarkets and other shopping places usually set lamps or lighting, on the one hand, can make the shopping place to form a bright and pleasant atmosphere to guide customers into the store; on the other hand, it can highlight the characteristics and colors of the goods, which not only can attract customers' attention, but also can make customers browse the goods in a comfortable visual environment, and then produce the impulse to shop.

Figure 1:
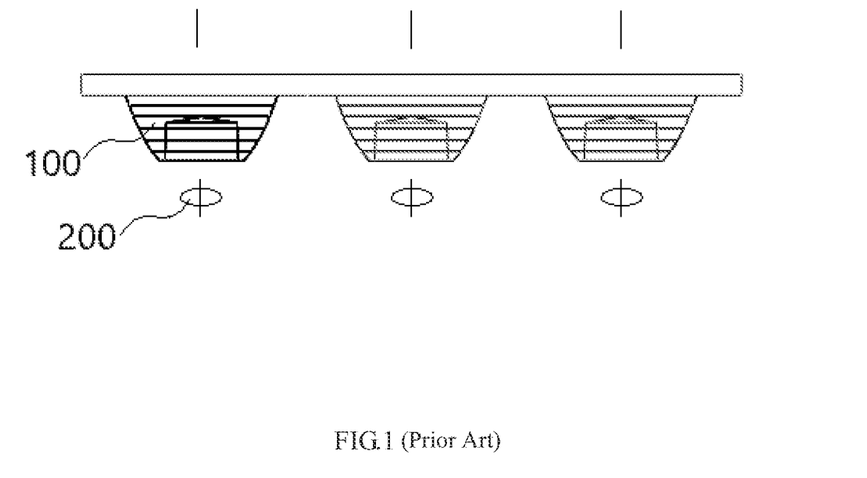
FIG. 1 is a schematic diagram of the cross-sectional structure of the lens before improvement (prior art)

As shown in FIG. 1, the existing shelf lights have the following problems: on the one hand, due to the relatively large size of the lamps, resulting in the size of the lens 100 is also large, complex manufacturing process, high cost; on the other hand, the lens 100 in the process of shaping the light source 200, it is difficult to target the light to the shelves, resulting in a large amount of light irradiated in the aisle between the shelves, not only makes the light distribution imbalance It is difficult to highlight the main effect of the goods on the shelves, the light efficiency is low, and increases the energy consumption of the light source.

BRIEF SUMMARY OF THE TECHNOLOGY

Therefore, the technical problem to be solved by the present invention is to overcome the defects of the prior art shelf light lens that makes it difficult to target the light to the shelf, resulting in imbalance of light distribution, and thus provide a lens that can target the light to the shelf and achieve balanced light distribution.

To solve the above technical problems, the present invention provides a lens comprising:
  a light receiving surface, set along the optical axis direction on the lens near the light source side; a light distribution surface, set along the optical axis direction opposite to the light receiving surface;
  said light receiving surface forming N sets of projections away from the central region of the optical axis, wherein N≥1; each set of said projections is provided with a first incident surface and a first reflective surface; said first incident surface is adapted to refract light to the first reflective surface; said first reflective surface is adapted to reflect light to the light distribution surface and refracted by the light distribution surface to the shelf Said light receiving surface forms a recessed portion near the center of the optical axis; said recessed portion is provided with a second incident surface, adapted to refract light to the light distribution surface and refracted by the light distribution surface to the shelf. When having a circular lens, the area near the center providing the recessed portion is an inner circle with a diameter of about 5-20% of the overall (maximum) diameter of the lens. The area away from the center which provides the N sets of projections is then an outer ring area with a diameter 20%-100% of the overall diameter of the lens, forming N sets of projection.

Optionally, said first reflective surface is a total reflective surface.

Optionally, N sets of said projections are provided with a cross-sectional shape along the first direction that tapers away from the optical axis vertically.

Optionally, said first incident surface forms an angle P with the optical axis, wherein the value of P ranges from 0<P<90°; the angle P corresponding to the N group of said projections is set in a decreasing direction vertically away from the optical axis.

Optionally, said projections are provided symmetrically with respect to the optical axis.

Optionally, said light distribution surface is a flat surface, said light distribution surface is set perpendicular to the optical axis.

The present invention further provides a light source module comprising:
  said lens;
  a light source, said light source being set on a side of the lens near the light receiving surface
  Said light source is set along the direction of the optical axis.

The technical solution of the present invention, has the following advantages:

1. the lens provided by the present invention, said light receiving surface forms N groups of projections away from the center region of the optical axis, wherein N≥1; each group of said projections is provided with a first incident surface and a first reflective surface; when a predetermined light is irradiated to the first incident surface along a first predetermined angle, said first incident surface first refracts the light to the first reflective surface along a second predetermined angle; then when the light is incident to the first reflective surface along a third predetermined angle, said first reflective surface After the light is incident to the first reflective surface along the third predetermined angle, the first reflective surface then reflects the light to the light distribution surface along the fourth predetermined angle; subsequently, when the light is incident to the light distribution surface along the fifth predetermined angle, the light is refracted to the shelf by the light distribution surface along the sixth predetermined angle, thus avoiding the main light from irradiating vertically on the ground, which is conducive to achieving the balance of light distribution and highlighting the main effect of the goods on the shelf.

2. The lens provided by the present invention, said light receiving surface forms a recessed part near the center region of the optical axis; said recessed part is provided with a second incident surface; when the pre-determined light is irradiated to the second incident surface along the seventh pre-determined angle, said second incident surface directly refracts the light to the light distribution surface along the eighth pre-determined angle; then when the light is incident to the light distribution surface along the ninth pre-determined angle, it is refracted by the light distribution surface to the shelf along the tenth pre-determined angle The light distribution surface is then refracted to the shelf by the light distribution surface along the tenth predetermined angle to make the main light guide to the shelf, so as to realize the balance of light distribution and highlight the main effect of goods on the shelf.

3. The lens provided by the present invention, said light receiving surface is formed into N groups of projections away from the central region of the optical axis, wherein N≥1; each group of said projections is provided with a first incident surface and a first reflective surface; said light receiving surface is formed into a recessed part near the central region of the optical axis; said recessed part is provided with a second incident surface; by providing the projections, thereby refracting light through the first incident surface to the first reflective surface, and then the first reflective surface reflects light to the shelf. By providing the projection, the light is refracted to the first reflective surface through the first incident surface, and then reflected to the light distribution surface by the first reflective surface, and the light is distributed to the shelf through the light distribution surface; by providing the recessed part, the light is refracted to the light distribution surface through the second incident surface, and the light is distributed to the shelf through the light distribution surface, so as to realize the targeted light distribution of the shelf by the lens and enhance the light efficiency.

4. The lens provided by the present invention, said first reflective surface is a fully reflective surface, when the light is refracted to said first reflective surface through the first incident surface, thus enabling the light to be fully reflected to the light distribution surface, thus reducing the light loss, which is conducive to reducing power consumption and/or energy consumption while achieving targeted light distribution of the shelf by the lens.

5. The lens provided by the present invention, said light receiving surface is provided with a first projection, a second projection, a third projection, a fourth projection, a fifth projection, a sixth projection, a seventh projection and an eighth projection in order along a direction vertically away from the optical axis; said first projection, second projection, third projection, fourth projection, fifth projection, sixth projection, seventh projection and eighth projection have a cross-sectional Shape along the vertical away from the optical axis direction gradually increasing set for the light source emitted by the angle of all-round coverage, so that the light source emitted by the light source can be received by the first incident surface and refracted to the first reflective surface to the maximum, and then improve the utilization of the light source of light, in order to achieve the lens on the shelf targeted light distribution at the same time, conducive to reducing power consumption and/or energy consumption.

6. The lens provided by the present invention, wherein said first incident surface forms an angle P with the optical axis, wherein the value of P ranges from 0<P<90°; the angle P corresponding to N sets of said projections is set asymptotically decreasing along the direction vertically away from the optical axis, so that the light emitted from the light source can be received and refracted to the first reflective surface by the first incident surface of each said projection to the maximum extent, thereby improving the light utilization of the light source. utilization rate, which is conducive to reducing power consumption and/or energy consumption while achieving targeted light distribution of the shelf by the lens.

BRIEF DESCRIPTION OF THE DRAWINGS

In order to more clearly illustrate the technical solutions in the specific embodiments or prior art of the present invention, the following is a brief description of the accompanying drawings that need to be used in the description of the specific embodiments or prior art, it is obvious that the accompanying drawings in the following description are some embodiments of the present invention, and other drawings can be obtained according to these accompanying drawings without creative work for a person of ordinary skill in the art.

DETAILED DESCRIPTION OF THE INVENTION

The technical solutions of the present invention will be clearly and completely described below in conjunction with the accompanying drawings, and it is clear that the described embodiments are a part of the embodiments of the present invention, and not all of them. Based on the embodiments in the present invention, all other embodiments obtained by a person of ordinary skill in the art without making creative labor fall within the scope of protection of the present invention.

In the description of the present invention, it should be noted that the terms "center", "top", "bottom", "left", "right", "vertical", "horizontal", "inside", "outside The orientation or positional relationships indicated by the terms "top", "bottom", "left", "right", "vertical", "horizontal", "inside", "outside", etc. are based on the orientation or positional relationships shown in the accompanying drawings and are intended only to facilitate and simplify the description of the invention, not to indicate or imply that the device or element referred to must have a particular orientation, be constructed and operate in a particular orientation, and therefore are not to be construed as limiting the invention. In addition, the terms "first", "second", "third" are used for descriptive purposes only and are not to be construed as indicating or implying relative importance.

In the description of the present invention, it is to be noted that, unless otherwise expressly specified and limited, the terms "mounted", "connected", "connected" are to be understood in a broad sense, for example, as For example, it can be a fixed connection, a removable connection, or a one-piece connection; it can be a mechanical connection or an electrical connection; it can be a direct connection or an indirect connection through an intermediate medium, and it can be a connection within two components. To a person of ordinary skill in the art, the specific meaning of the above terms in the present invention can be understood on a case-by-case basis.

Furthermore, the technical features involved in the different embodiments of the invention described below can be combined with each other as long as they do not constitute a conflict between them.

Figure 2:
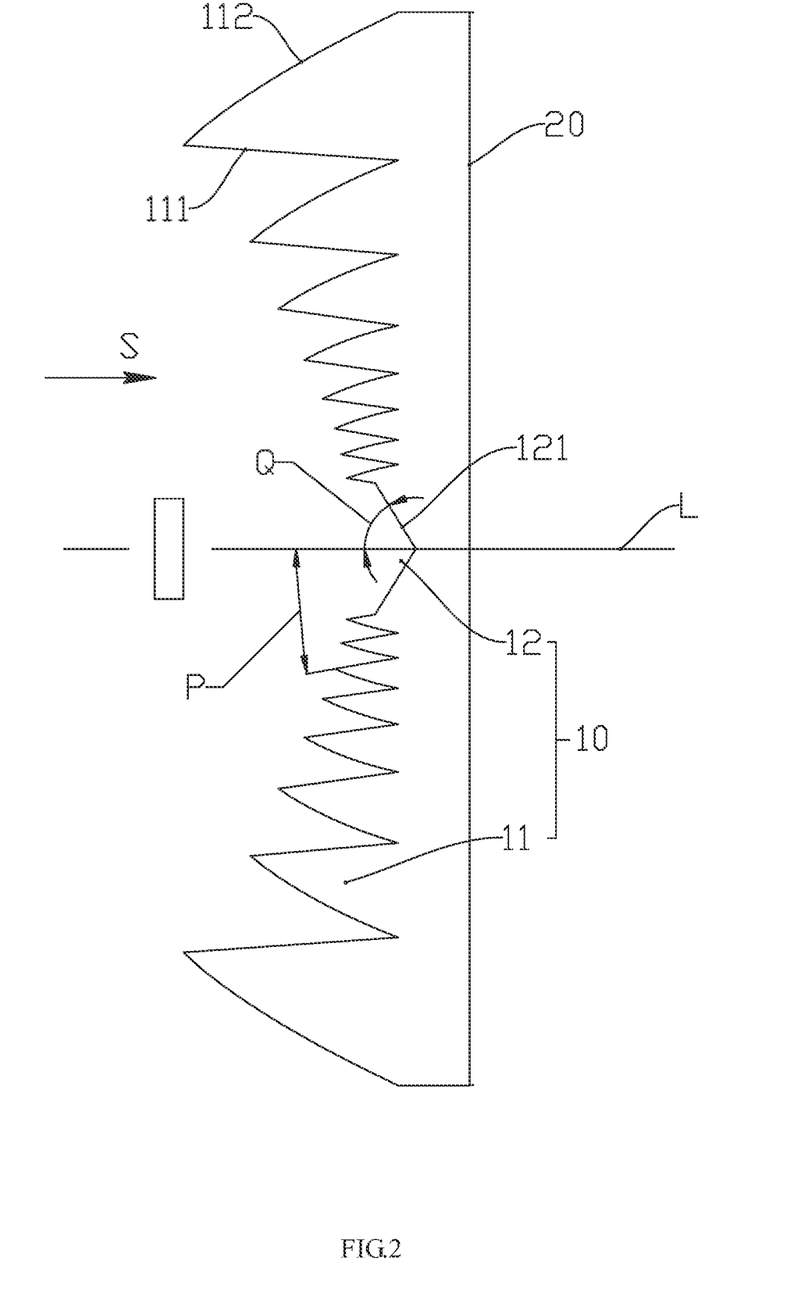
FIG. 2 shows a schematic diagram of the cross-sectional structure of the lens of the present invention.

In combination with FIGS. 2-FIG. 8, the present embodiment provides a lens comprising:

a light receiving surface 10, set along the optical axis direction on the lens near the light source 30 side; a light distribution surface 20, set along the optical axis direction opposite to the light receiving surface 10;

said light receiving surface 10 forming N sets of projections 11 away from the central region of the optical axis, wherein N≥1; each set of said projections 11 provided with a first incident surface 111 and a first reflective surface 112; said first incident surface 111 adapted to refract light to the first reflective surface 112; said first reflective surface 112 adapted to reflect light to the light distribution surface 20, and refracted by the light distribution surface 20 to the shelf 40; the projections 11 have a saw tooth profile, and the projections are distributed symmetrically around the center axis L.

Said light receiving surface 10 is formed into a recessed portion 12 near the central region of the optical axis; said recessed portion 12 is provided with a second incident surface 121, adapted to refract light to the light distribution surface 20 and refracted by the light distribution surface 20 to the shelf 40.

It should be noted that said optical axis refers to the axis indicated by the lead "L" in FIG. 1, and the light still propagates along a straight line after being incident through said optical axis L. The light is refracted when it is incident from a region other than said optical axis L, and the refracted light is not on the same axis as the incident light; said first direction refers to the direction indicated by the arrow "S" in FIG. 1. "S" in FIG. 1, said first direction being parallel to said optical axis L; said cross-sectional shape of said lens perpendicular to the optical axis L includes, but is not limited to, a rectangle, a circle, an ellipse or a square, which can be adjusted according to the actual distribution of the shelf and is not limited to the situation described in this embodiment; the number, size and tilt angle of said projection 11 can be adjusted according to the specific height of the shelf. The number, size and inclination angle of said projection 11 can be adjusted according to the actual situation of the specific height and specific distribution of the shelf, and are not limited to the situation described in this embodiment.

As an example of the distribution of said projections 11, in this embodiment, eight groups of projections 11 are formed on the light receiving surface 10 away from the center of the optical axis; the eight groups of said projections 11 are, in order, the first projection, the second projection, the third projection, the fourth projection, the fifth projection, the sixth projection, the seventh projection and the eighth projection along the direction vertically away from the optical axis; each group of said projections 11 is provided with a first inlet section, a second inlet section, a third inlet section, a fourth inlet section, a fifth inlet section, a sixth inlet section, a seventh inlet section and an eighth inlet section. Each set of said projections 11 is provided with a first incident surface 111 and a first reflective surface 112.

Figure 6:
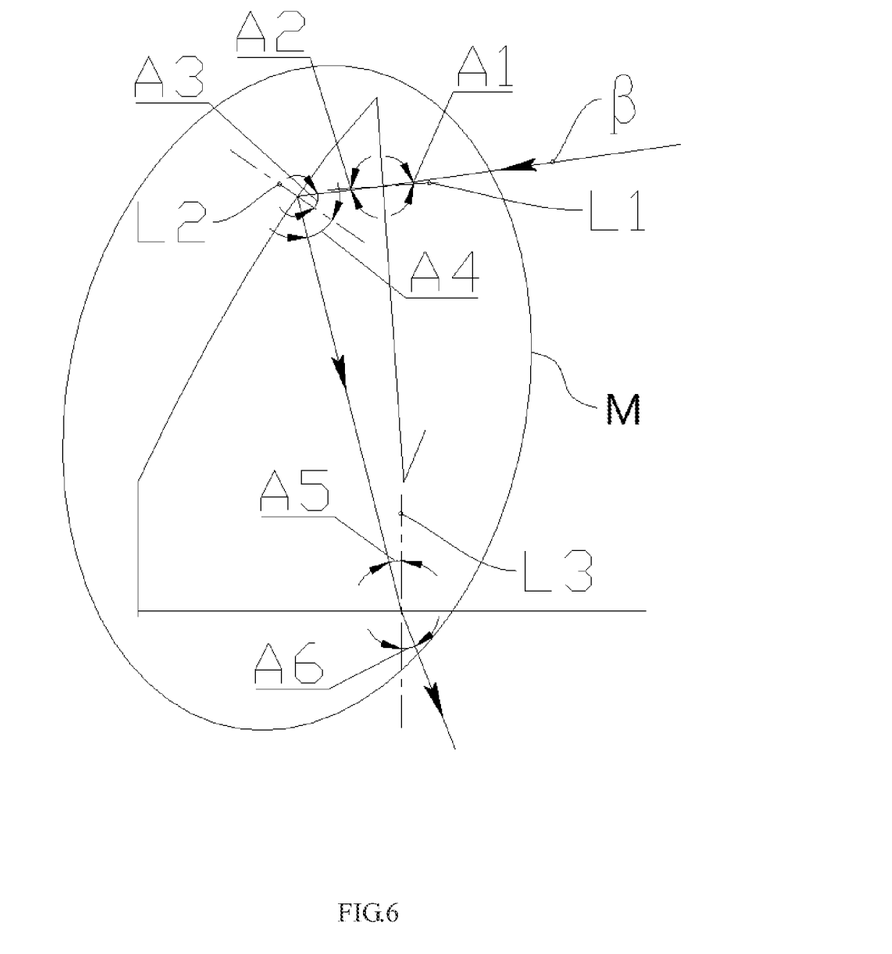
FIG. 6 shows an enlarged view at M in FIG. 5.

It should be noted that said pre-determined light refers to the line pointed by lead "β" in FIG. 6; said first normal refers to the line pointed by lead "L1" in FIG. 6, said first normal being perpendicular to the first incident surface 111; said second normal refers to the line pointed by lead "L2" in FIG. 6; said second normal refers to the line pointed by lead "L2" in FIG. 6. said second normal refers to the line indicated by lead "L2" in FIG. 6, said second normal intersecting the first reflecting surface 112 at a point, said second normal being perpendicular to the tangent plane and/or tangent line of the first reflecting surface 112 at that point; said third normal refers to the line indicated by lead "L3" in FIG. 6 said third normal refers to the line referred to in FIG. 6, said third normal being perpendicular to the light distribution surface 20; said first preset angle refers to the angle A1 formed by the light ray β in FIG. 6 with said first normal L1; said second preset angle refers to the angle A2 formed by the light ray β in FIG. 6 with said first normal L1 after refraction by the first incident surface 111; said third preset angle refers to the angle A3 formed by the light ray β in FIG. 6 with said second normal L2; said third preset angle refers to the angle A3 formed by the light ray β in FIG. 6 with said second normal L2 said fourth pre-determined angle refers to the angle A4 formed by the light ray β in FIG. 6 with said second normal L2 after total reflection by the first reflecting surface 112; said fifth pre-determined angle refers to the angle A5 formed by the light ray β in FIG. 6 with said third normal L3; said sixth pre-determined angle refers to the angle A6 formed by the light ray β in FIG. 6 with said third normal L3 after refraction by or at the distribution surface 20 of the lens; said first pre-determined angle refers to the angle A6 formed by the light ray β in FIG. 6 with said third normal L3 after refraction by the first incident surface 111. said first preset angle, said second preset angle, said third preset angle, said fourth preset angle, said fifth preset angle and said sixth preset angle can be introduced according to the laws of refraction and total reflection and the relative refractive index of the lens; said first preset angle, said second preset angle, said third preset angle, said fourth preset angle, said fifth preset angle and said sixth preset angle can be adjusted in size according to the specific position of the shelf specific position and are not limited to the case described in this embodiment.

Figure 5:
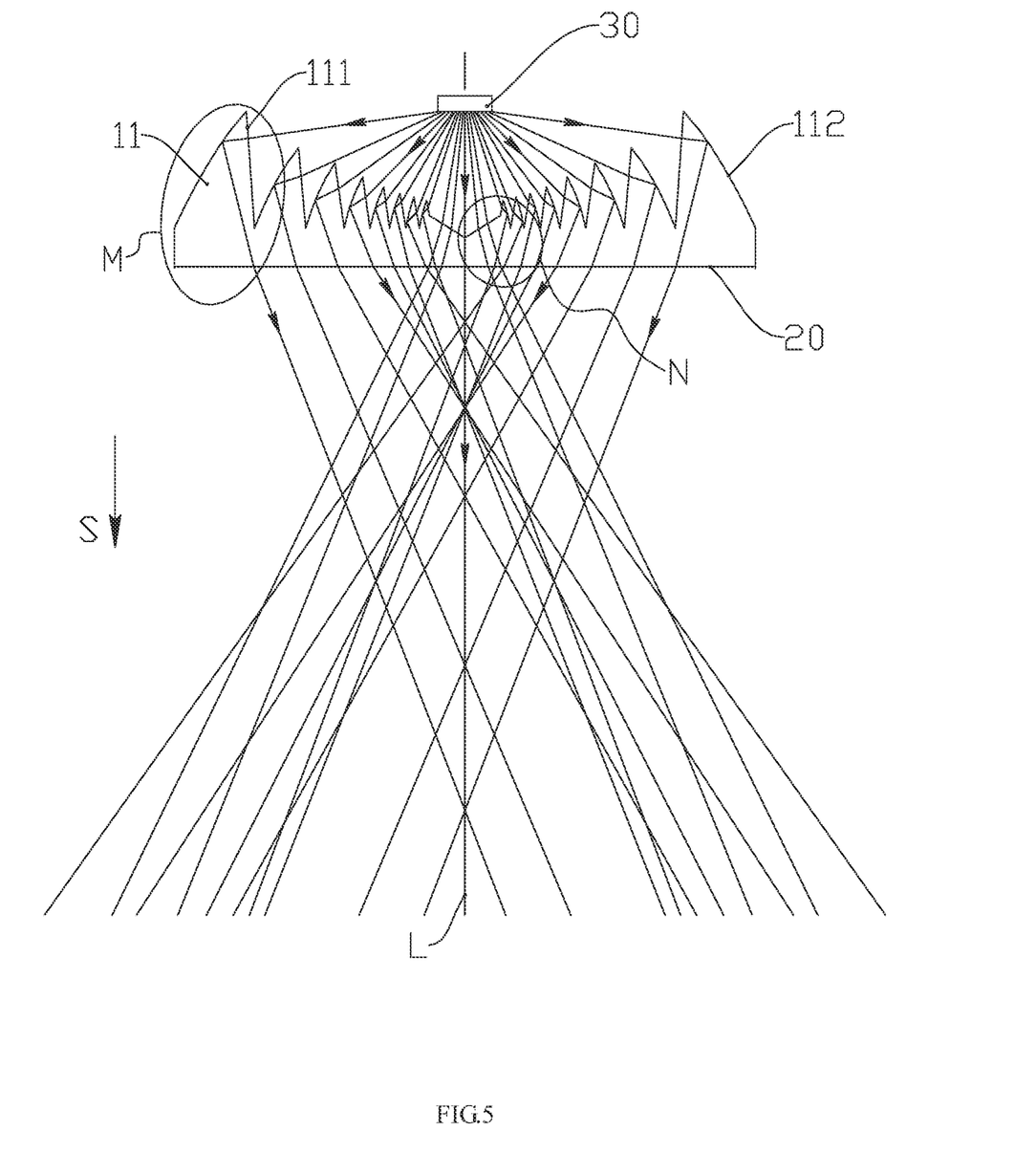
FIG. 5 is a schematic diagram of the optical path of the lens of the present invention.

Combined with FIG. 5 and FIG. 6, in this embodiment, said light receiving surface 10 forms N groups of projections 11 away from the center region of the optical axis, where N 1; each group of said projections 11 is provided with a first incident surface 111 and a first reflective surface 112; when the predetermined light p irradiates to the first incident surface 111 along the first predetermined angle, said first incident surface 111 first refracts the light along the second predetermined angle to the first reflective surface 112 refracts the light to the first reflective surface 112 along the second pre-determined angle; then when the light is incident to the first reflective surface 112 along the third pre-determined angle, the first reflective surface 112 reflects the light to the light distribution surface 20 along the fourth pre-determined angle; then when the light is incident to the light distribution surface 20 along the fifth pre-determined angle, the light is refracted to the shelf 40 by the light distribution surface 20 along the sixth pre-determined angle, thus avoiding the main light from shining vertically on the ground, which is conducive to achieve light distribution balance and highlight the main effect of the goods on the shelf.

Figure 7:
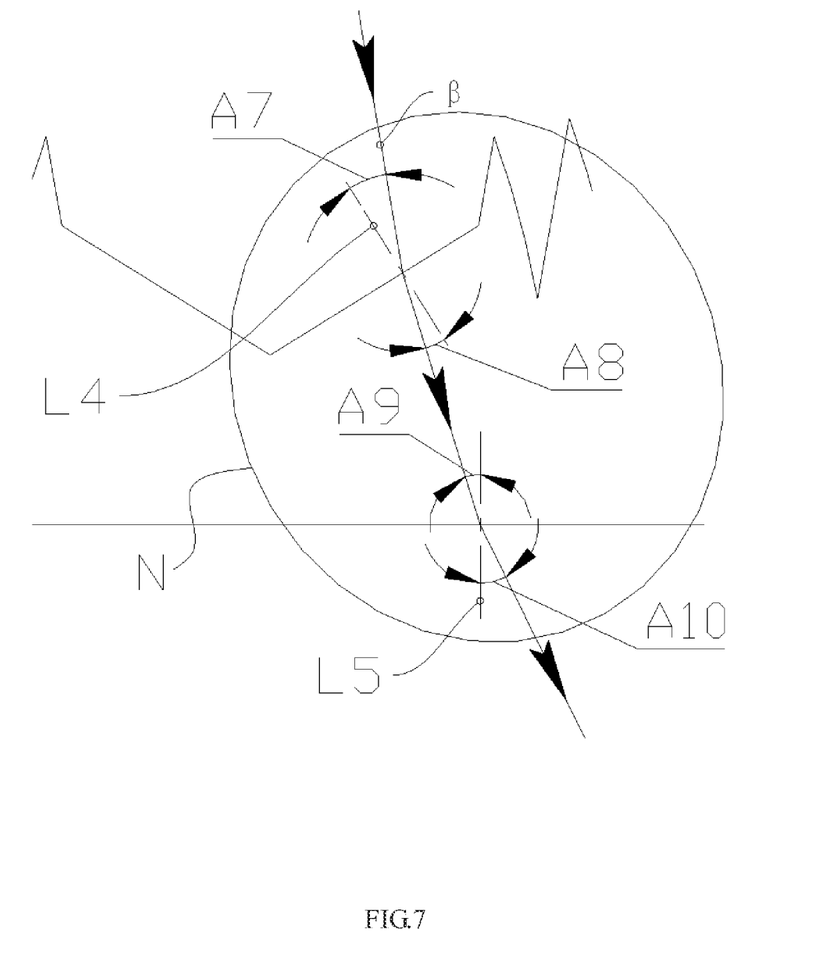
FIG. 7 is an enlarged view of N in FIG. 5.

It should be noted that said preset light refers to the line pointed by lead "p" in FIG. 7; said fourth normal refers to the line pointed by lead "L4" in FIG. 7, said fourth normal is perpendicular to the second incidence plane 121; said fifth normal refers to the line pointed by lead "L5" in FIG. 7; said fifth normal refers to the line pointed by lead "L5" in FIG. 7. Said ninth pre-determined angle refers to the angle A9 formed by the light ray β in FIG. 7 with said fifth normal L5; said tenth pre-determined angle refers to the angle A10 formed by the light ray β in FIG. 7 with said fifth normal L5 after refraction by or at the distribution surface 20 of the lens; said seventh pre-determined angle, eighth pre-determined angle, ninth pre-determined angle and tenth pre-determined angle can be derived according to the law of refraction and the relative The seventh preset angle, the eighth preset angle, the ninth preset angle and the tenth preset angle can be adjusted according to the specific position of the shelf and are not limited to the case described in this embodiment.

Combined with FIG. 5 and FIG. 7, in this embodiment, said light receiving surface 10 forms a recessed part 12 near the central region of the optical axis; said recessed part 12 is provided with a second incident surface 121; when the preset light p irradiates to the second incident surface 121 along the seventh preset angle, said second incident surface 121 directly refracts the light to the light distribution surface 20 along the eighth preset angle; then when the light is incident along the ninth preset angle The light is then refracted at or by the light distribution surface 20 of the lens along the tenth preset angle to the shelf 40, so that the main light is guided to the shelf, thus achieving a balanced light distribution and highlighting the main effect of the goods on the shelf.

In this embodiment, said light receiving surface 10 is formed away from the central region of the optical axis N groups of projection 11, where N≥1; each group of said projection 11 is provided with a first incident surface 111 and a first reflective surface 112; said light receiving surface 10 is formed near the central region of the optical axis recessed part 12; said recessed part 12 is provided with a second incident surface 121; by providing the projection 11, so as to pass the light through The first incident surface 111 is refracted to the first reflective surface 112, and then the first reflective surface 112 reflects the light to the light distribution surface 20, and the light is distributed to the shelf through the light distribution surface 20; by providing the recessed portion 12, the light is refracted to the light distribution surface 20 through the second incident surface 121, and the light is distributed to the shelf through the light distribution surface 20, thus realizing the targeted light distribution of the lens to the shelf and enhancing the light efficiency.

Specifically, the first reflective surface 112 is a fully reflective surface.

As shown in FIG. 5, in this embodiment, the first reflective surface 112 is a fully reflective surface, when the light is refracted to the first reflective surface 112 by the first incident surface 111, so that all the light can be reflected to the light distribution surface 20, thus reducing the light loss and realizing the targeted light distribution of the shelf by the lens, while helping to reduce power consumption and/or energy consumption.

Optionally, said first reflective surface 112 is a fully reflective surface.

Specifically, the cross-sectional shape of said projections 11 in the N group along the first direction is set in a gradual increase along the direction vertically away from the optical axis.

In this embodiment, the light receiving surface 10 is provided with a first projection, a second projection, a third projection, a fourth projection, a fifth projection, a sixth projection, a seventh projection and an eighth projection along the direction vertically away from the optical axis; the first projection, the second projection, the third projection, the fourth projection, the fifth projection, the sixth projection, the seventh projection and the cross-sectional shape of the eighth projection is set in a gradual increase along the direction vertically away from the optical axis, so that the light emitted from the light source 30 can be received by the first incident surface 111 and refracted to the first reflective surface 112 to the maximum extent, thereby improving the utilization rate of the light from the light source 30, which is conducive to reducing power consumption and/or energy consumption while achieving targeted light distribution of the shelf by the lens.

Figure 3:
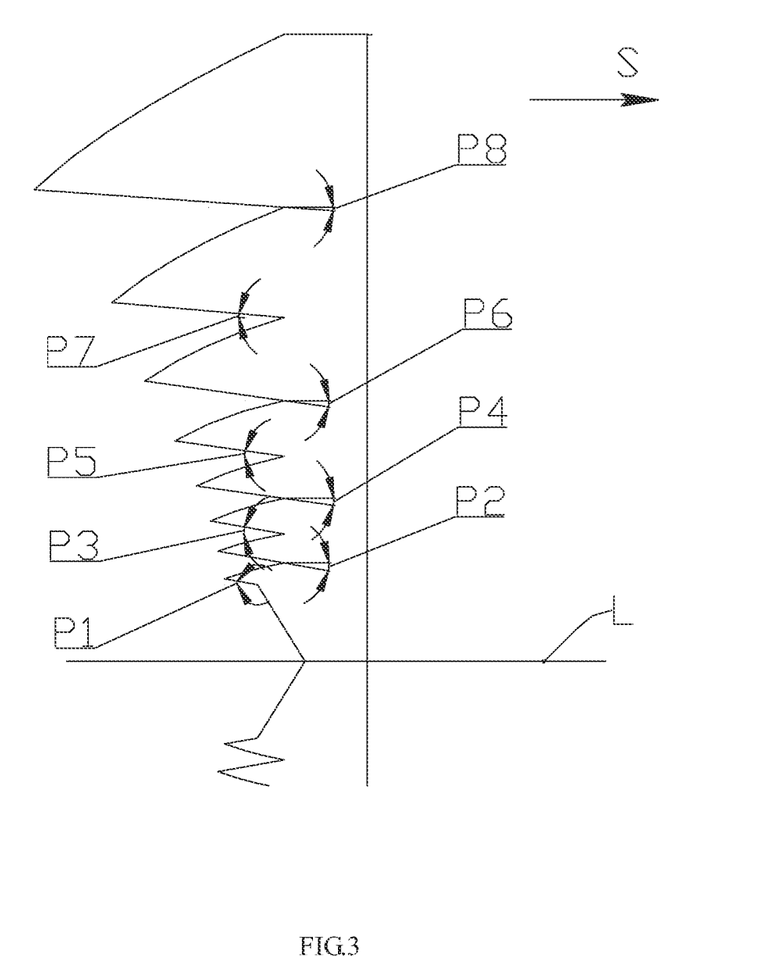
FIG. 3 shows a schematic diagram of the angle between the first incident surface and the optical axis of each group of projections of the lens of the present invention.
Figure 4:
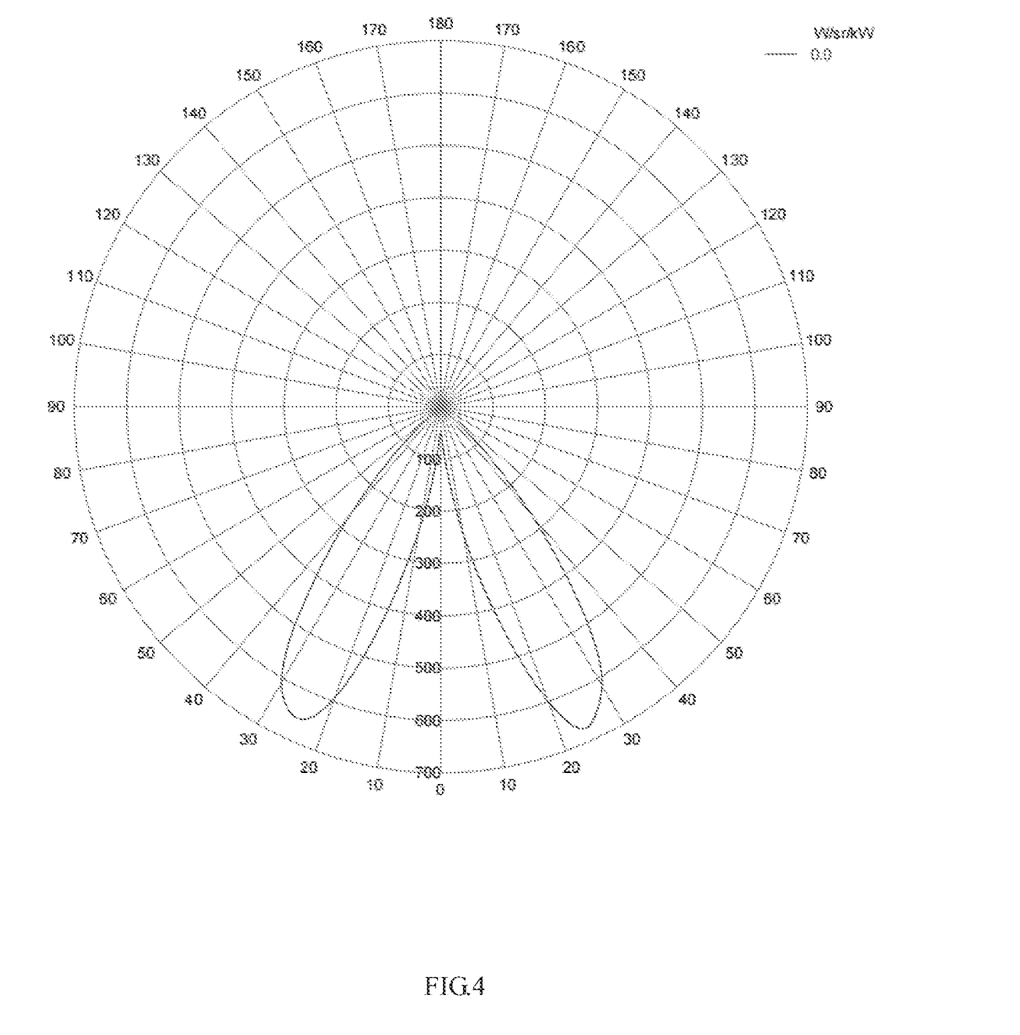
FIG. 4 is a diagram of the light distribution curve of the lens of the present invention.

Specifically, said first incident surface 111 forms an angle P with the optical axis, wherein P takes a value in the range of 0<P<90°; the angle P corresponding to the N group of said projections 11 is set in a decreasing direction along the vertical away from the optical axis.

Optionally, the first incident surface 111 of said first projection forms an angle P1 with the optical axis, wherein P1 takes a value of 10°.

Optionally, said first incident surface 111 of said second projection forms an angle P2 with the optical axis, wherein the value of P2 is 10°.

Optionally, said first incident surface 111 of said third projection forms an angle P3 with the optical axis, wherein P3 takes the value of 10°.

Optionally, said first incident surface 111 of said second projection forms an angle P4 with the optical axis, wherein the value of P4 is 8°.

Optionally, said first incident surface 111 of said second projection forms an angle P5 with the optical axis, wherein the value of P5 is 8°.

Optionally, said first incident surface 111 of said second projection forms an angle P6 with the optical axis, wherein the value of P6 is 8°.

Optionally, said first incident surface 111 of said second projection forms an angle P7 with the optical axis, wherein the value of P7 is taken as 5°.

Optionally, said first incident surface 111 of said second projection forms an angle P8 with the optical axis, wherein the value of P8 is taken as 4°.

Combined with FIG. 3, in this embodiment, said first incident surface 111 of the lens forms an angle P with the optical axis, where the value of P ranges from 0<P<90°; the angle P corresponding to the N group of said projections 11 is set to decrease vertically away from the optical axis, so that the light emitted by the light source 30 can be received by the first incident surface 111 of each said projection 11 and refracted to the first reflecting surface 112 to the maximum extent, thus improving the light source 30. reflecting surface 112, thereby improving the utilization of the light from the light source 30 and facilitating the reduction of power consumption and/or energy consumption while achieving targeted light distribution of the shelf by the lens.

Specifically, said projections 11 are provided symmetrically with respect to the optical axis.

Optionally, N sets of projections 11 are provided symmetrically relative to the optical axis, so that the light from the light source 30 is evenly directed to the shelves on both sides of the lens, thereby achieving balanced light distribution on the shelves on both sides of the lens.

Specifically, said light distribution surface 20 is a flat surface, and said light distribution surface 20 is set perpendicular to the optical axis.

Combined with FIG. 5, in this embodiment, said light distribution surface 20 is a flat surface, said light distribution surface 20 is set perpendicular to the optical axis, and said light distribution surface 20 and light receiving surface 10 form a transition section along the optical axis direction, so as to form the propagation path of light in the lens.

This embodiment also provides a light source module, specifically an LED light source module comprising:

a lens as described above;

alight source 30, said light source 30 being provided on the side of the lens near the light receiving surface 10;

Said light source 30 is provided along the direction of the optical axis.

Optionally, said light source 30 is an LED light source.

Figure 8:
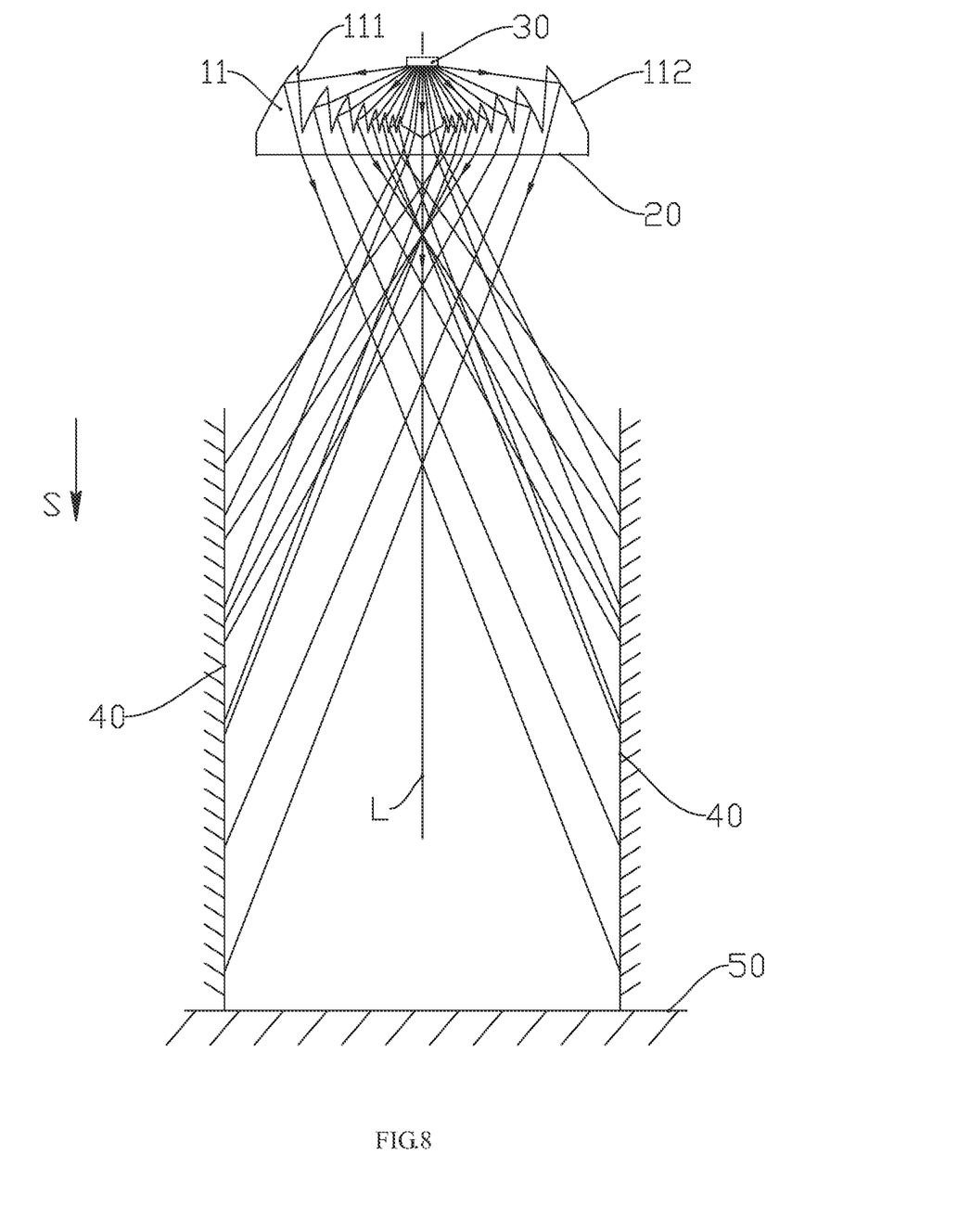
FIG. 8 is a schematic diagram of the working principle of the light source module of the present invention.

Combined with FIG. 8, said light source module is set above the ground 50 in the first direction; said light source module is set between two sets of shelves 40, when said light source module works, most of the light from the light source 30 can be targeted to the shelves 40 on both sides through said lens, so as to achieve targeted light distribution to the shelves 40 and achieve a balanced light distribution.

Obviously, the above-mentioned embodiments are only examples for clarity and are not a limitation of the way of implementation. For those of ordinary skill in the art, there are other variations or changes that can be made in different forms based on the above description. It is not necessary or possible to exhaust all embodiments here. The obvious variations or changes derived therefrom are still within the scope of protection of the invention.

What is claimed is:

1. A lens (100) for covering a light source, comprising:
a light receiving surface (10) facing the light source (30), the light receiving surface having an optical axis, a light distribution surface (20) being opposite to the light receiving surface (10);
wherein said light receiving surface (10) is formed in a region away from a center of the optical axis with N sets of projections (11), where N≥1, each set of said projections (11) is facing the light source and provided with a first incident surface (111) facing towards the optical axis and a first reflective surface (112) facing away from the optical axis, said first incident surface (111) is adapted to refract light from the light source to the first reflective surface (112), said first reflective surface (112) of the lens is adapted to reflect the light to the light distribution surface (20),
said light receiving surface (10) has a depression region (12) near the center of the optical axis, said depression region (12) is provided with a second incident surface (121) adapted to refract the light to the light distribution surface (20),
the N sets of projections have a saw tooth profile and are distributed symmetrically around the optical axis.

2. The lens (100) according to claim 1, wherein said first reflective surface (112) is a total reflective surface.

3. A light source module, comprising:
a lens (100) as claimed in claim 2;
a light source (30), wherein said light source (30) being arranged on the side of the lens (100) near the light receiving surface (10);
wherein said light source (30) is arranged along the direction of the optical axis.

4. The lens (100) according to claim 1, wherein N sets of said projections (11) are provided with a cross-sectional shape along the first direction tapering away from the optical axis in the vertical direction.

5. The lens (100) according to claim 4, wherein said first incident surface (111) forms an angle P with the optical axis, wherein P takes a value in the range 0<P<90°; the angle P corresponding to the N group of said projections (11) is set asymptotically decreasing along the direction vertically away from the optical axis.

6. The lens (100) according to claim 5, wherein said projections (11) are set symmetrically with respect to the optical axis.

7. A light source module, comprising:
a lens (100) as claimed in claim 5;
a light source (30), wherein said light source (30) being arranged on the side of the lens (100) near the light receiving surface (10);
wherein said light source (30) is arranged along the direction of the optical axis.

8. A light source module, comprising:
a lens (100) as claimed in claim 4;
a light source (30), wherein said light source (30) being arranged on the side of the lens (100) near the light receiving surface (10);
wherein said light source (30) is arranged along the direction of the optical axis.

9. A light source module, comprising:
a lens (100) as claimed in claim 3;
a light source (30), wherein said light source (30) being arranged on the side of the lens (100) near the light receiving surface (10);
wherein said light source (30) is arranged along the direction of the optical axis.

10. The lens (100) according to claim 1, wherein said light distribution surface (20) is planar and said light distribution surface (20) is arranged perpendicular to the optical axis.

11. A light source module, comprising:
a lens (100) as claimed in claim 6;
a light source (30), wherein said light source (30) being arranged on the side of the lens (100) near the light receiving surface (10);
wherein said light source (30) is arranged along the direction of the optical axis.

12. A light source module, comprising:
a lens (100) as claimed in claim 1;
a light source (30), wherein said light source (30) being arranged on the side of the lens (100) near the light receiving surface (10);
wherein said light source (30) is arranged along the direction of the optical axis.

* * * * *